M. W. KOUNS.
REVERSIBLE TRANSMISSION GEARING.
APPLICATION FILED MAY 4, 1908.
922,599.
Patented May 25, 1909.
2 SHEETS—SHEET 2.
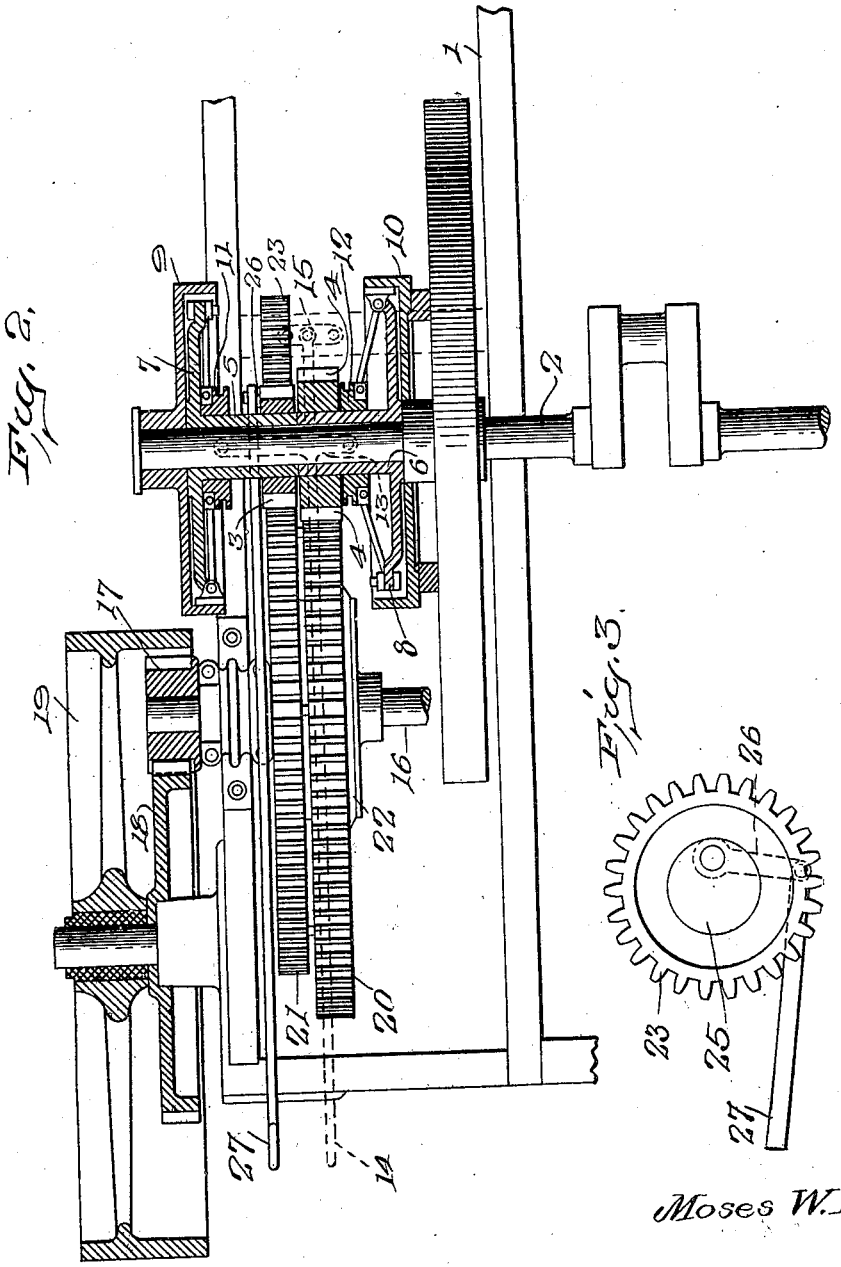
Inventor
Moses W. Kouns,

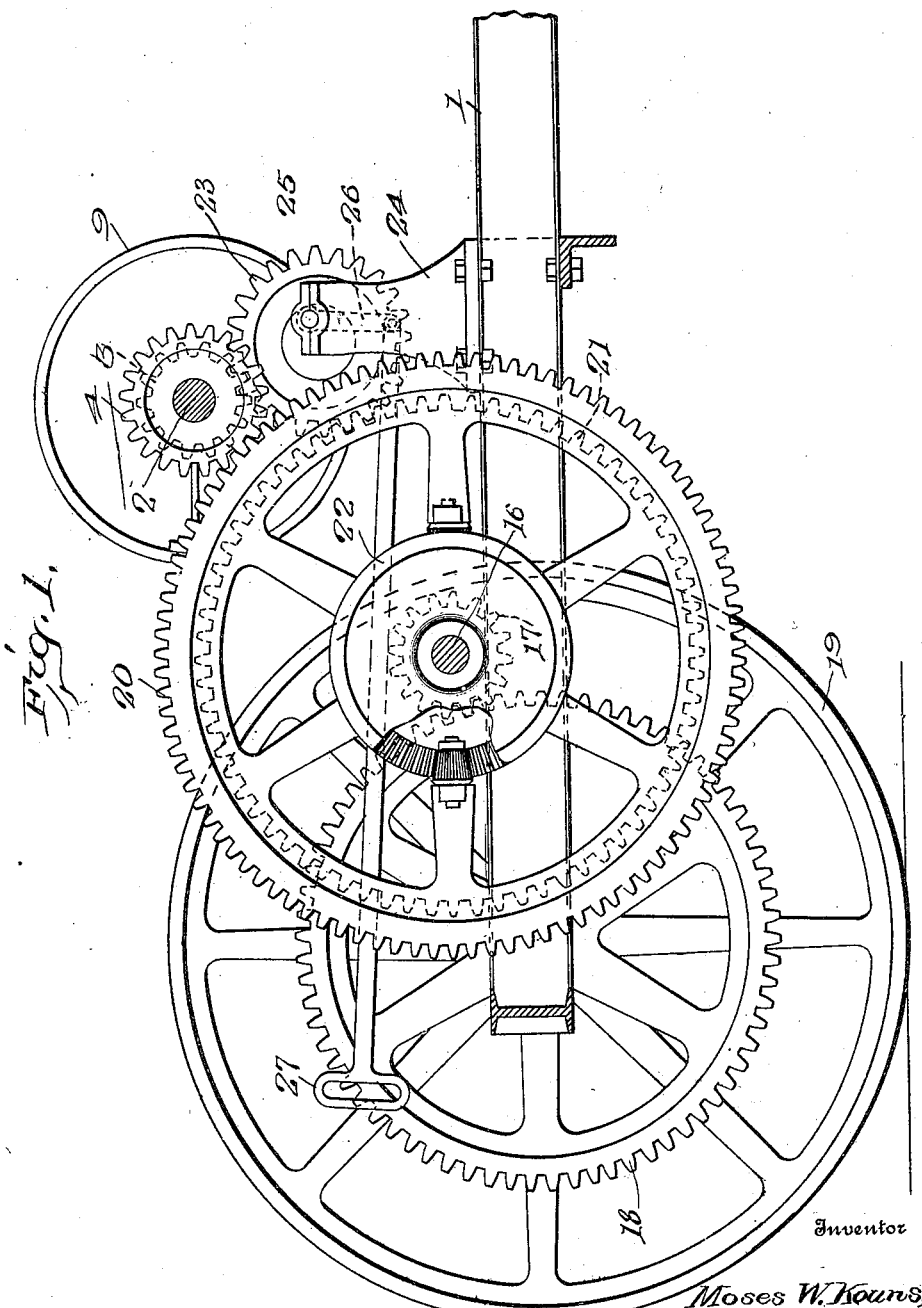

UNITED STATES PATENT OFFICE.

MOSES W. KOUNS, OF COLUMBUS, OHIO, ASSIGNOR TO THE OHIO MANUFACTURING COMPANY, OF UPPER SANDUSKY, OHIO, A CORPORATION OF OHIO.

REVERSIBLE TRANSMISSION-GEARING.

No. 922,599.   Specification of Letters Patent.   Patented May 25, 1909.

Application filed May 4, 1908.   Serial No. 430,685.

*To all whom it may concern:*

Be it known that I, MOSES W. KOUNS, a citizen of the United States, residing at Columbus, in the county of Franklin and State of Ohio, have invented certain new and useful Improvements in Reversible Transmission-Gearing, of which the following is a specification, reference being had therein to the accompanying drawings.

This invention relates to reversible transmission gearing and the object of the invention is to provide a gearing of this character peculiarly adapted for use in connection with gasolene traction engines, which will be simple in its construction, employing but a minimum number of gears and thereby reducing the friction and noise; in which the reversing mechanism may be disconnected from the driven shaft when the machine is being driven forward; and in which the intermediate pinion of the reversing mechanism, when moved out of engagement with the gear on the driven shaft, will remain in mesh with the driving pinion; and to so improve the detailed construction and arrangement of the several parts of the device as to render the same more effective in its operation and less liable to become disarranged.

With these objects in view my invention consists in certain novel features of construction and in certain parts and combinations hereinafter to be described, and then more particularly pointed out in the claims.

In the accompanying drawings, Figure 1 is a side elevation of a portion of a traction engine embodying my invention; Fig. 2 is a top plan view of the same, partly in section; and Fig. 3 is a detail view of the intermediate pinion for the reversing mechanism.

In these drawings I have illustrated the preferred form of my invention and have shown the same in connection with a traction engine of ordinary construction, only a part of the engine being shown in the drawings. The frame of the engine is here indicated by the numeral 1 and has mounted thereon a driving shaft 2 upon which are mounted two driving pinions 3 and 4 which are provided with suitable clutch mechanism for securing the same to the shaft 2. In the present instance I have shown the pinions 3 and 4 mounted upon sleeves 5 and 6, respectively, which sleeves are rotatably mounted upon the shaft 2 and are provided at their outer ends with the clutch mechanism for securing the same to the shaft. This clutch mechanism preferably comprises clutch members 7 and 8 rigidly secured to the outer ends of the sleeves and adapted to coöperate with the other clutch members 9 and 10 carried by the shaft 2. Suitable collars 11 and 12 are slidably mounted upon the sleeves 5 and 6 and are adapted to be moved longitudinally thereof to operate the clutch members, these clutch members being of a well known construction. In order that the two clutches may be operated simultaneously to connect one of the pinions to the shaft and disconnect the other therefrom, I preferably provide a yoke 13 having its ends connected with the collars 11 and 12 and carried by a lever 14, the forward end of which is pivoted to the frame 1 at a point in front of the yoke, as shown at 15, and has its other end extending rearwardly to a point within reach of the operator. Thus, by actuating the lever 14 the two clutch members will be simultaneously actuated to disconnect one of the pinions from the shaft 2 and connect the other thereto.

A driven shaft 16 is mounted in the main frame 1 and extends substantially parallel with the driving shaft 2. This shaft is provided at its outer ends with pinions 17 adapted to mesh with the gears 18 of the traction wheels 19, of which but one is shown in the present drawings. Mounted on the shaft 16, and preferably rigidly secured one to the other, are a plurality of gears 20 and 21, the gear 20 being of a slightly greater diameter than the gear 21. In the form here shown, the gear 21 is in the form of an annulus rigidly secured to one side of the gear 20, which gear is preferably connected to the shaft 16 by means of suitable compensating gearing 22. The gear 20 is mounted in alinement with the pinion 4 on the driving shaft 2 and these pinions are of such relative diameters that they are at all times in mesh one with the other, and, when the pinion 4 is rigidly secured to the shaft 2, the gear 20 will be rotated in such a direction as to drive the engine forward. The gear 21 is mounted in alinement with the pinion 3 on the driving shaft 2 and the relative diameters of the gear and the pinion are such that they are out of mesh one with the other and are operatively connected one to the other by means of an intermediate pinion 23 which is supported upon bearing brackets 24 carried by the main frame 1. Thus, when the pinion 4 is disconnected from the shaft 2 and the pinion 3 is connected thereto, the gear 21 and the driven shaft 16, to which it is connected through the medium of the gear 20, will be rotated in a reverse direction. In order that the several gears of the reversing mechanism may not be actuated when the machine is driven in a forward direction, it is desirable that the intermediate gear 23 should be so mounted that it can be moved out of mesh with the gear 21. To this end, I have provided the intermediate gear with an eccentric bearing 25 which is operated by means of an arm 26, which, in turn, is connected to a rearwardly extending lever 27, the rear end of which is located within reach of the operator. The eccentric bearing for the intermediate gear is so arranged that, when the lever 27 is moved in one direction, this gear will move away from the gear 21, but will follow about the circumference of the pinion 3, thus remaining at all times in mesh with that pinion, and, when the lever is moved in the opposite direction, this intermediate pinion will be moved directly into engagement with the gear 21 and the reversing mechanism connected up ready for operation when the clutch mechanism shall have been operated to rigidly secure the pinion 3 to the driving shaft 2.

The operation of the device will be readily understood from the foregoing description and it will be apparent that I have provided a reversing mechanism of this character which is extremely simple in its construction and which embodies a minimum number of moving parts; that, when the machine is being driven in a forward direction, the reversing mechanism will be stationary, thus reducing the friction and wear incident to the continuous movement of this mechanism; and also, that the intermediate gear is at all times in mesh with the driving pinion and is so mounted that it can be readily moved into and out of engagement with the driven gear.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a traction engine transmission gear, the following instrumentalities: a frame, a driving shaft supported thereby, one member of each of two clutches rigidly mounted on said shaft, movable members of each of said two clutches loosely mounted on said shaft, means to operate the movable members of the clutches, a pinion mounted around said shaft and rigidly connected to one of the movable clutch members, another pinion similarly mounted and connected to the other movable clutch member, an intermediate pinion mounted on a movable bearing adapting it to be moved into and out of mesh with one of said pinions, a driven shaft, compensating gearing carried thereby, two gear wheels secured together and to the compensating gearing, one of said wheels meshing constantly with the first-mentioned pinion and the other being adapted to be connected with the second-mentioned pinion through the intermediate pinion, means to operate the intermediate pinion, ground wheels, and gearing connecting the same with the driven shaft.

2. In a traction engine, the combination, with ground wheels, a shaft operatively connected to said ground wheels, a compensating gearing mounted on said shaft, a gear carried by said compensating gearing, and a second gear secured to the first-mentioned gear and adapted to move in unison therewith, of a crank shaft, a pair of pinions loosely mounted on said crank shaft, means for operatively connecting either of said pinions to said shaft, one of said pinions being normally in mesh with one of said gears, an intermediate gear adapted to mesh with the second gear and with the second pinion, and an eccentric bearing for said intermediate gear, whereby said intermediate gear may be moved out of engagement with one of said members.

In testimony whereof, I affix my signature in presence of two witnesses.

MOSES W. KOUNS.

Witnesses:
H. H. NEWELL,
W. R. HARE.